UNITED STATES PATENT OFFICE.

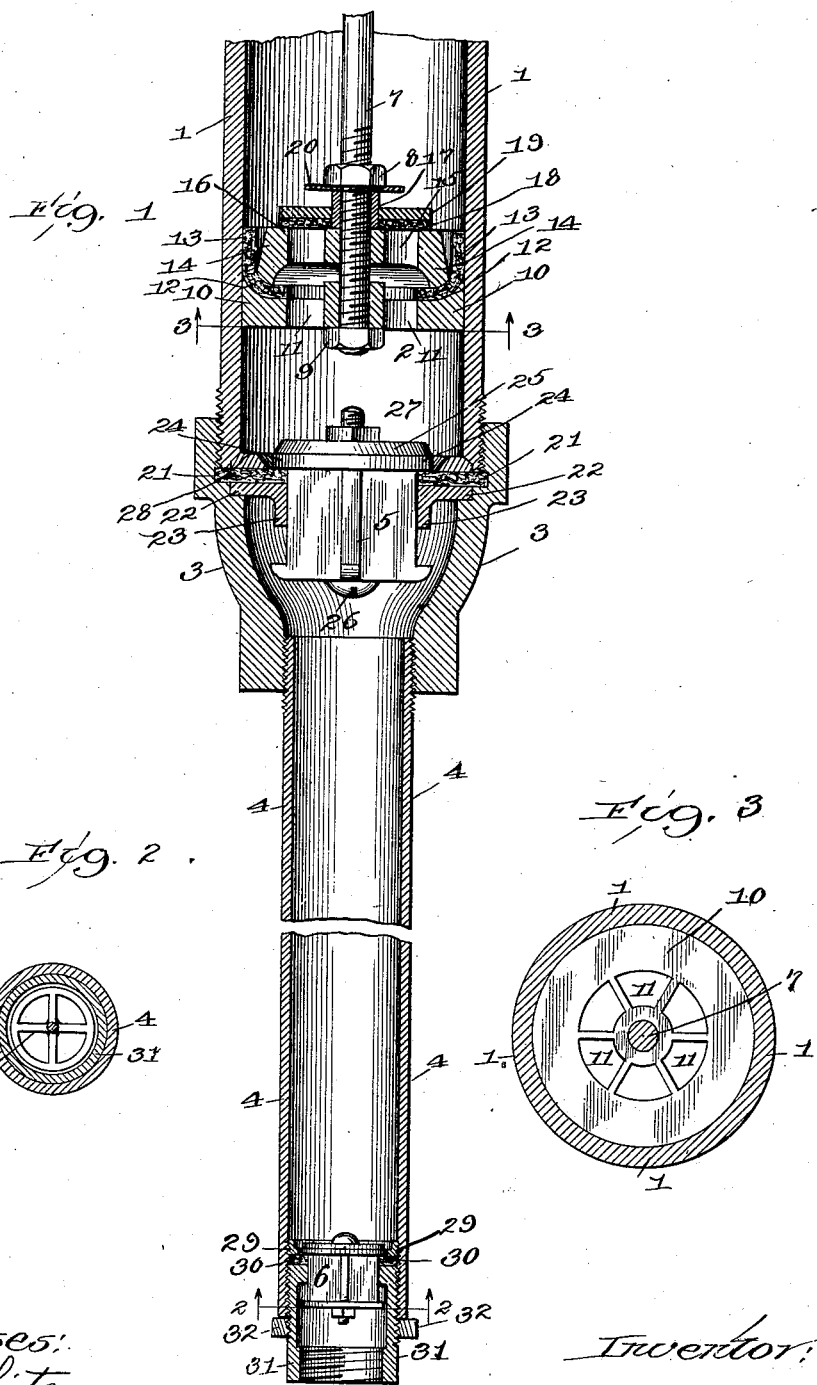

WILLIAM A. KERFOOT, OF EVANSTON, ILLINOIS, ASSIGNOR TO KATHERINE KERFOOT, OF EVANSTON, ILLINOIS.

FORCE-PUMP.

SPECIFICATION forming part of Letters Patent No. 718,771, dated January 20, 1903.

Application filed October 28, 1901. Serial No. 80,213. (No model.)

*To all whom it may concern:*

Be it known that I, WILLIAM A. KERFOOT, of Evanston, in the county of Cook and State of Illinois, have invented certain new and useful Improvements in Force-Pumps; and I hereby declare that the following is a full, clear, and exact description thereof, reference being had to the accompanying drawings, which form part of this specification.

My invention relates to improvements in force-pumps.

My invention consists in certain features, details of construction, and combination of parts, which will first be described in connection with the accompanying drawings and then particularly pointed out in the claims.

In the drawings, Figure 1 is a vertical central section of the various novel parts constituting my pump. Fig. 2 is a section through line 2 2 of Fig. 1. Fig. 3 is a section through line 3 3 of Fig. 1.

In all of the views the same numerals of reference indicate similar parts.

1 is a cylinder in which the piston 2 is adapted to be reciprocated.

3 is a valve-chamber that unites the cylinder with the suction-pipe 4. 5 is a valve of a peculiar construction within the said chamber.

6 is a valve within the suction-pipe 4.

My invention represents some new and very valuable features, which I will now proceed to describe.

7 is a piston-rod, and 8 and 9 are the nuts by means of which the piston is held in position on the said rod. The piston is composed of a disk 10, provided with a series of openings 11 around the center. Through said center the piston-rod 7 passes. The disk is also provided with an annularly-curved or concave seat 12 for the leather or other yielding packing 13. A follower 14 is threaded upon the rod 7 and is a means by which the yielding leather packing 13 is clamped to the disk 10. The follower is provided with a number of perforations 15, that register with the perforations in the disk. The upper surface 16 of the follower 14 is the valve-seat. A spacing-collar 17 surrounds the rod 7 and provides a means for limiting the opening of the valve, which is composed of a leather disk 18 and a seating metal disk 19. These two disks loosely surround the spacing-collar 17. A washer 20 is contained between the nut 8 and the spacing-collar 17. The object of this washer is to prevent the valve from tilting and sticking on the collar 17. I prefer to make the spacing-collar 17 of brass or some non-oxidizable metal.

One of the special features of my invention consists in reducing the diameter of the follower 14 gradually from its contact with the packing to its upper surface, thereby providing a tapering annular clearance or space between the said leather packing and the said follower. The object of this clearance or space is to prevent the piston from becoming wedged tightly into the cylinder when the leather packing becomes swollen by dampness. As shown in the drawings, the weight of the water above the piston will fill the annular tapered clearance or space contained between the follower 14 and the inside surface of the leather packing and cause the packing-surface to be pressed outwardly into very intimate contact with the inside surface of the cylinder, and thereby the leather packing will perform all of the usual functions for which it is intended without the undesirable feature of being wedged into the cylinder at such times as I have described. When the parts have been assembled in the manner shown by the drawings, the nuts 8 and 9 when screwed tightly to the rod 7 will hold all of the parts of my piston and valve in proper position. The weight of the water upon the packing 13 is distributed uniformly upon the broad surface afforded by the seat 12, made by the upwardly-curving annular surface in the disk 10. The even distribution of the pressure upon a large surface of the leather washer prevents cracking and breaking, so frequent and common in pumps in which the leather washers or packing are placed in the usual manner.

Another feature of my pump consists in providing a soft yielding valve-seat 21, preferably made of leather, which is also a means for providing a water-tight joint between the cylinder 1 and the valve-chamber 3. The valve-chamber 3 is provided with an annular groove, producing a shoulder upon which the leather washer 21 is adapted to be inserted and upon which it rests. Under this leather washer is a metal valve-seat 22, which may be made removable and which is adapted to fit into and be received by another annular groove and which is covered by the leather washer. The valve-seat 22 may be made integral with the valve-chamber 3, or it may be made separable, as shown in the drawings. It is provided with a lower extending flange 23. The usual cross-shaped guide for the valve 24 is loosely fitted into the flange 23 and is adapted to be reciprocated therein. The valve is preferably composed of a soft-rubber disk 24, crowned with a metal disk 25, both being held in position to the guide by means of the screw 26 and the nut 27.

The upper end of the valve-chamber 3 is threaded to receive the cylinder 1.

28 is an interiorly and exteriorly annular chamfered ring having a sufficiently large interior diameter to permit the valve 24 to be seated therein upon the packing 21. The ring is placed upon the leather packing 21, and when the cylinder 1 is screwed into the valve-chamber 3 the lower interior edge of the cylinder, which has been previously chamfered for that purpose, impinges upon the tapered exterior edge of the said ring and holds the said ring firmly in position on the leather packing 21. At the same time the lower surface of the cylinder makes contact with the leather packing 21, and thereby produces a water-tight joint between said cylinder and said valve-chamber. The ring 28 is placed over the top of the leather packing 21 for the purpose of holding the said leather packing in position and preventing it from rising when the valve is lifted, and thereby retaining the valve closed. The impingement of the cylinder upon its outside surface is a convenient and ready means for holding the said ring in position.

All of the parts are conveniently arranged, easily assembled, and very efficient in operation and construction.

6 is a foot-valve of my pump, which is adapted to be screwed into the lower end of the suction-pipe 4. The valve portion is similar to that just described. An annular exteriorly-threaded ring 29 is adapted to be screwed into the pipe 4 ahead of the valve. Its interior diameter is sufficiently large to admit the valve and to allow some clearance for the passage of a fluid between the valve and the interior diameter of the said ring. A leather washer or packing 30 is adapted to be next inserted into the suction-pipe 4 until it lies up against the ring 29. Then an interiorly and exteriorly threaded valve-cage 31 is screwed into the suction-pipe 4 until its upper surface comes into contact with the leather packing. It is then tightened therein, and to hold it firmly in place check-nut 32 may be then screwed up until it is tight against the lower end of the suction-pipe 4. The cage 31 is threaded interiorly, so that another section of pipe may be screwed therein, if desired.

A cap somewhat in the shape of the valve-chamber 3 may be inverted and placed upon the upper end of the cylinder 1, and extension-pipes similar to the suction-pipe 4 may be screwed therein, and by this means the cylinder 1 may be placed very near the water-level. This is very desirable in force-pumps, especially where the lift would otherwise be of some considerable extent.

Having described my invention, what I claim as new and useful, and desire to secure by Letters Patent of the United States, is—

1. The combination with a pump, of a cylinder threaded upon its lower end, a valve-chamber threaded upon its upper end to receive said cylinder, an annular groove in said valve-chamber providing a shoulder under said thread, a yielding, perforated disk in said groove providing a valve-seat and a packing between said cylinder and said valve-chamber, a valve-seat upon which said perforated disk rests, a valve adapted to be seated on said disk, and a ring surrounding said valve, resting upon said disk and held in place by impingement of the wall of the cylinder thereupon, substantially as set forth.

2. In a pump the combination, of the valve-chamber 3, the cylinder 1 and the pipe 4 adapted to be screwed into the end of said valve-chamber, a removable valve-seat 22, a yielding perforated disk 21 of larger diameter than said cylinder, a groove providing a shoulder in which said disk rests, a ring 28 held upon said disk by impingement of said cylinder, and a valve 5 seated upon said disk, substantially as set forth.

In testimony that I claim the foregoing as my own I affix my signature in presence of two witnesses.

WILLIAM A. KERFOOT.

Witnesses:
 FORÉE BAIN,
 M. F. ALLEN.